(12) United States Patent
Lipcsei

(10) Patent No.: US 8,193,758 B2
(45) Date of Patent: Jun. 5, 2012

(54) CIRCUITS AND METHODS FOR POWER CONVERSION

(75) Inventor: Laszlo Lipcsei, Campbell, CA (US)

(73) Assignee: O2 Micro, Inc, Santa Clara, CA (US)

( * ) Notice: Subject to any disclaimer, the term of this patent is extended or adjusted under 35 U.S.C. 154(b) by 0 days.

(21) Appl. No.: 12/605,815

(22) Filed: Oct. 26, 2009

(65) Prior Publication Data

US 2010/0102773 A1   Apr. 29, 2010

Related U.S. Application Data

(60) Provisional application No. 61/197,494, filed on Oct. 27, 2008.

(51) Int. Cl.
*H02J 7/00* (2006.01)
*H01M 10/46* (2006.01)

(52) U.S. Cl. .................... 320/101; 320/125; 320/128

(58) Field of Classification Search .................. 320/101, 320/125, 128
See application file for complete search history.

(56) References Cited

U.S. PATENT DOCUMENTS

| | | | | |
|---|---|---|---|---|
| 6,118,254 A | * | 9/2000 | Faulk | 320/141 |
| 6,326,771 B1 | * | 12/2001 | Popescu-Stanesti | 320/139 |
| 6,414,403 B2 | | 7/2002 | Kitagawa et al. | |
| 6,462,507 B2 | * | 10/2002 | Fisher, Jr. | 320/101 |
| 6,768,047 B2 | | 7/2004 | Chang et al. | |
| 6,864,669 B1 | * | 3/2005 | Bucur | 323/268 |
| 2006/0185727 A1 | * | 8/2006 | Matan | 136/293 |
| 2007/0075682 A1 | * | 4/2007 | Guang et al. | 320/128 |

FOREIGN PATENT DOCUMENTS

CN  1659930 A  8/2005

* cited by examiner

*Primary Examiner* — Samuel Berhanu

(57) ABSTRACT

A power conversion circuit includes a solar panel and a power converter. The solar panel is operable for providing electric power having an output voltage. The power converter coupled to the solar panel is capable of selectively operating in a charging mode and a powering mode. The power converter transfers the electric power from the solar panel to a power source and maintains the output voltage at a threshold voltage in the charging mode. The power converter delivers power from the power source to a load in the powering mode.

20 Claims, 6 Drawing Sheets

CIRCUITS AND METHODS FOR POWER CONVERSION

RELATED APPLICATION

This application claims priority to U.S. Provisional Application No. 61/197,494, titled "Charging and Boost Circuit and System", filed on Oct. 27, 2008, which is hereby incorporated by reference in its entirety.

BACKGROUND

A solar energy system includes a photovoltaic panel or a solar panel capable of generating direct current (DC) electric power when it is exposed to light. The solar panel has a positive-negative (PN) junction structure and has the characteristics similar to a PN junction diode. When photons hit the PN junction, the recombination of electrons and holes of the PN junction can result in an electrical current. However, the solar panel provides power depending on working environment such as optical density, weather, location, and temperature. Thus, the generated electric power may not be stable.

SUMMARY

In one embodiment, a power conversion circuit includes a solar panel and a power converter. The solar panel is operable for providing electric power having an output voltage. The power converter coupled to the solar panel is capable of selectively operating in a charging mode and a powering mode. The power converter transfers the electric power from the solar panel to a power source and maintains the output voltage at a threshold voltage in the charging mode. The power converter delivers power from the power source to a load in the powering mode.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments in accordance with the present disclosure provides a power conversion circuit. The power conversion circuit includes a power converter and a power source, e.g., a solar panel. The solar panel can convert light power into electric power and can provide an output voltage. The power converter can selectively operate in at least a charging mode and a powering mode according to the output voltage of the solar panel. In the charging mode, the power converter can transfer power from the solar panel to a battery. In the powering mode, the power converter can deliver power from the battery to a load.

In one embodiment, the power converter can select the operating mode according to a comparison result between the output voltage of the solar panel and a threshold voltage. Advantageously, in the charging mode, the power converter can control the output voltage or current of the solar panel (e.g., maintain the output voltage of the solar panel at the threshold voltage) such that the solar panel can generate a maximum power output. Thus, the efficiency of the power conversion circuit can be improved. Moreover, the power converter uses a single power stage, e.g., a switching circuit and an inductor, to perform different power conversions in both the charging mode and the powering mode. Thus, the power conversion circuit can be simplified and cost of the power conversion circuit can be reduced.

Figure 1:
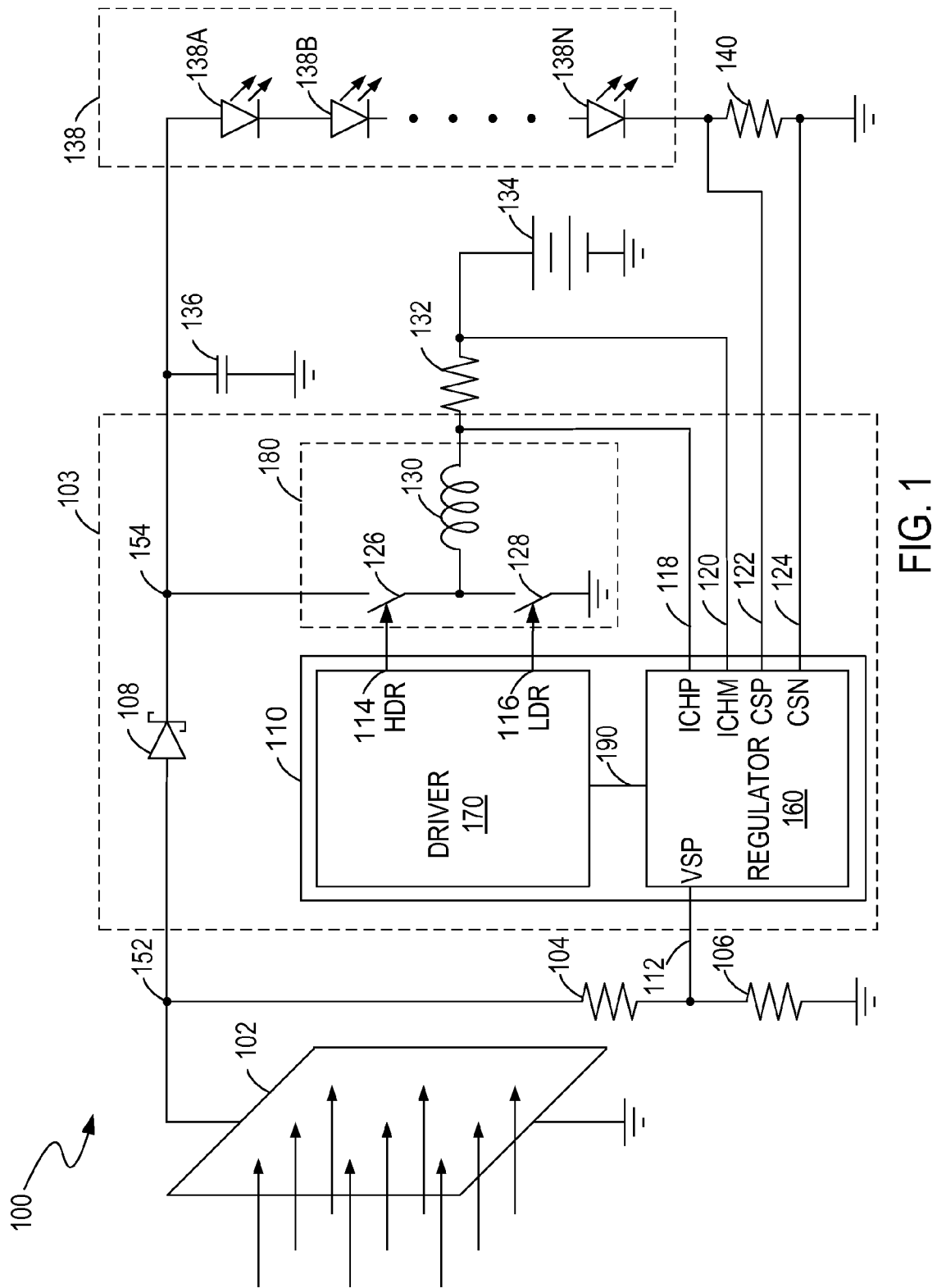
FIG. 1 illustrates a schematic diagram of a power conversion circuit, in accordance with one embodiment of the present invention.

FIG. 1 illustrates a schematic diagram of a power conversion circuit 100, in accordance with one embodiment of the present invention. The power conversion circuit 100 includes a solar panel 102, a battery 134, a power converter 103, and a load 138. In one embodiment, the load 138 includes a light emitting diode (LED) string having LEDs 138A, 138B, ... 138N coupled in series. The power converter 103 coupled to the solar panel 102 is operable for charging the battery 134 and for powering the LED string 138. The power converter 103 includes a diode 108, a controller 110, and a power stage 180 including a high side switch 126, a low side switch 128, and an inductor 130.

The solar panel 102 and the LED string 138 are coupled to the high side switch 126. The battery 134 is coupled to the high side switch 126 and the low side switch 128 through the inductor 130 and a resistor 132. In one embodiment, the single power stage 180 is used to charge the battery 134 by the power from the solar panel 102, or to boost the battery 134 to power the LED string 138. A capacitor 136 can be coupled in parallel with the LED string 138 for filtering the ripple of the output voltage/current when powering the LED string 138.

The switches 126 and 128 can be metal oxide semiconductor field effect transistors (MOSFETs), in one embodiment. The battery 134 can be a rechargeable battery pack with one or more battery cells, such as lithium ion (LiIon) battery cells, nickel-cadmium (NiCd) battery cells, or lead-acid battery cells, etc.

The controller 110 can be configured to generate control signals including a high side switch drive signal 114 and a low side switch drive signal 116 for controlling the high side switch 126 and the low side switch 128, respectively. The controller 110 can further include several input pins such as a voltage sense panel (VSP) pin 112, an ICHP pin 118, an ICHM pin 120, a CSP pin 122, and a CSN pin 124. In one embodiment, the controller 110 includes a regulator 160 and a driver 170. The regulator 160 is coupled to the input pins to generate a regulation signal 190. In one embodiment, the regulation signal 190 is a pulse width modulation (PWM) signal. The driver 170 coupled to the regulator 160 is operable for generating the drive signals 114 and 116 according to the regulation signal 190. The high side switch 126 and the low side switch 128 are enabled alternately by the drive signals 114 and 116, in one embodiment. Assuming that the regulation signal 190 is a PWM signal, when the PWM signal is in a high state, the high side switch 126 can be enabled and the low side switch 128 can be disabled. This state is referred to herein as a switch-on state in the present disclosure. Likewise, when the PWM signal is in a low state, the high side switch 126 can be disabled and the low side switch 128 can be enabled. This state is referred to as a switch-off state in the present disclosure. As such, the ratio of a time period of the switch-on state to a time period of the switch-off state can be determined by a duty cycle of the PWM signal.

The power converter 103 can operate in multiple operation modes including, but is not limited to, a charging mode and a powering mode. During daytime or in a relatively bright environment, the solar panel 102 can convert light power to electric power, and the power converter 103 can operate in the charging mode, e.g., the power converter 103 charges the battery 134 by transferring the electric power from the solar panel 102 to the battery 134. Furthermore, in the example of FIG. 1, the solar panel 102 can charge the battery 134 and power the LED string 138 simultaneously in the charging mode. During nighttime or in a relatively dark environment, the power converter 103 can operate in the powering mode, e.g., the power converter 103 powers the LED string 138 by delivering power from the battery 134 to the LED string 138. The solar panel 102 can generate the electric power having an output voltage $V_{SOLAR}$ and an output current $I_{SOLAR}$ at a node 152 when it is exposed to the light (e.g., artificial light or sunlight). The characteristics of the solar panel 102 are illustrated in FIG. 2 and FIG. 3.

In one embodiment, the power converter 103 is capable of monitoring the output voltage $V_{SOLAR}$ and selectively operating in the charging mode and the powering mode according to the output voltage $V_{SOLAR}$. The condition to operate in the charging mode or the powering mode can be determined by the voltage at the VSP pin indicating the output voltage $V_{SOLAR}$. If the voltage at the VSP pin is greater than a threshold voltage (e.g., when the solar panel 102 is under a relatively bright light condition), the power converter 103 can operate in the charging mode. If the voltage at the VSP pin is less than the threshold voltage (e.g., when the solar panel 102 is under a relatively dark light condition), the power converter 103 can operate in the powering mode.

As stated above, the ratio of the time period of the switch-on state to the time period of the switch-off state can be determined by the duty cycle of the PWM signal 190. Furthermore, the ratio of the time period of the switch-on state to the time period of the switch-off state determines a charging current $I_{CHARGE}$ flowing through the battery 134 in the charging mode and an LED operating current $I_{LED\_ON}$ flowing through the LED string 138 in the powering mode. As such, the charging current $I_{CHARGE}$ and the LED operating current $I_{LED\_ON}$ can be regulated by the PWM signal 190. In the charging mode, the PWM signal 190 regulates the solar panel current $I_{SOLAR}$ output from the solar panel 102 by regulating the charging current $I_{CHARGE}$.

Figure 2:
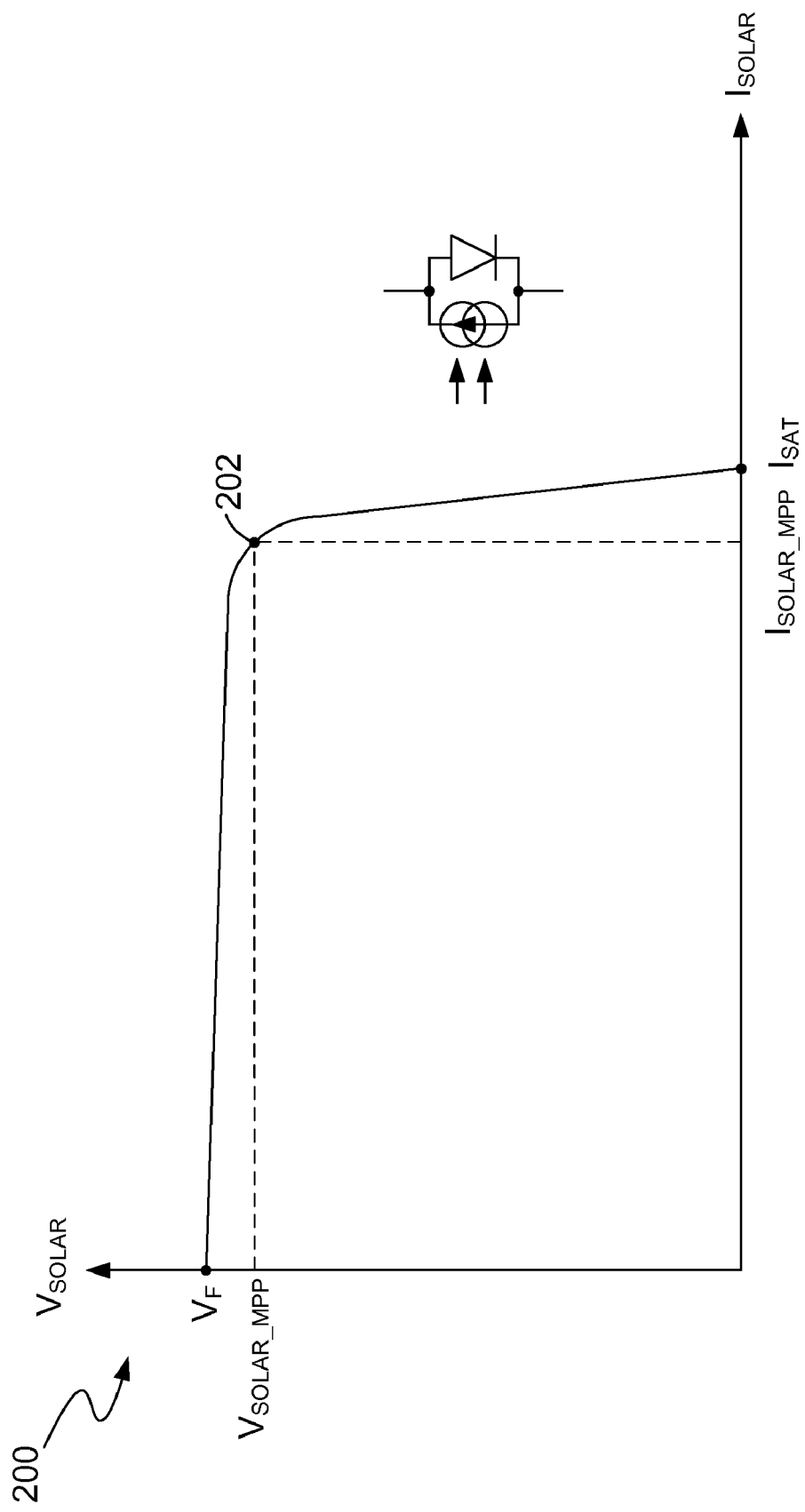
FIG. 2 illustrates an example of a current versus voltage plot of a solar panel, in accordance with one embodiment of the present invention.
Figure 3:
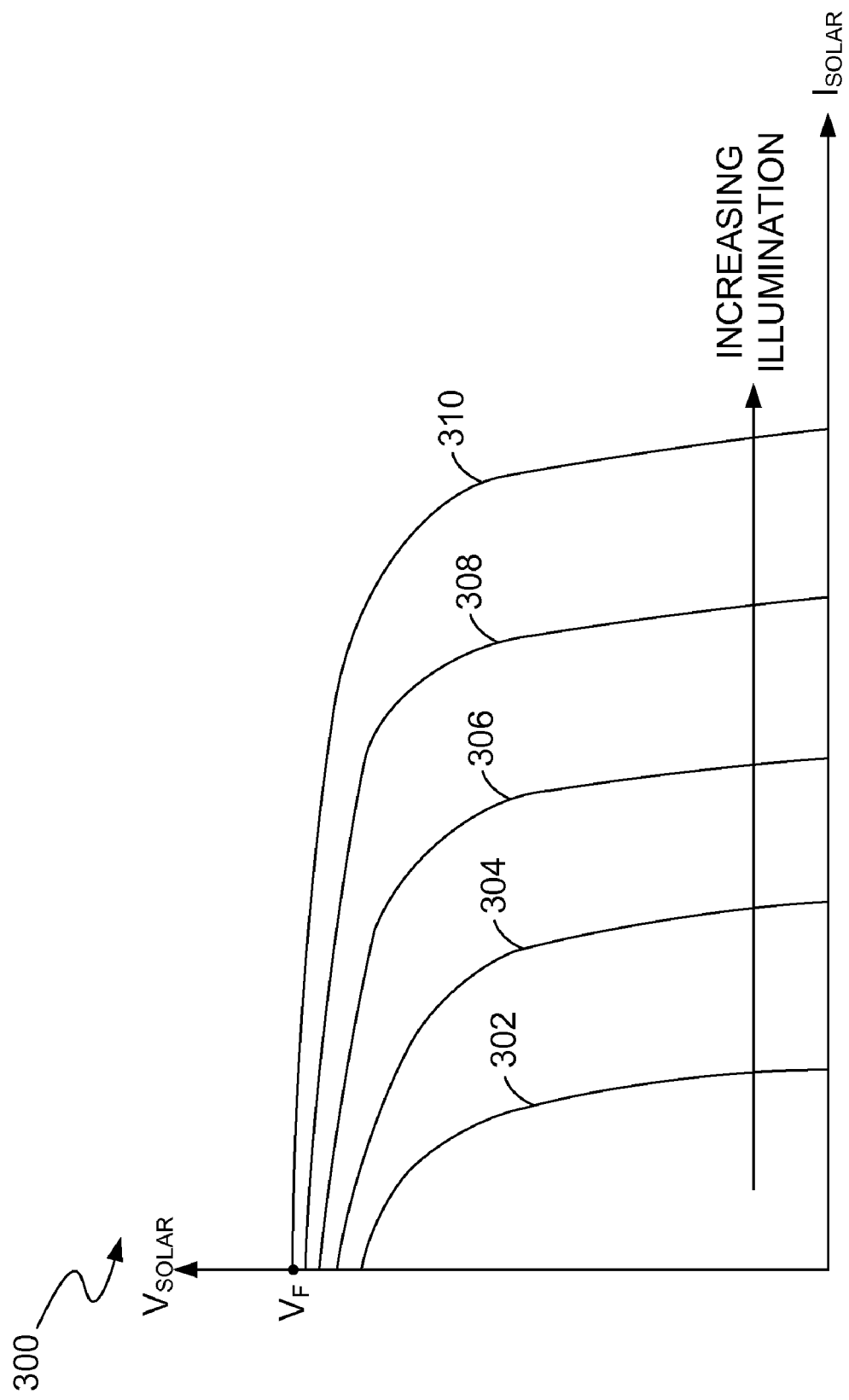
FIG. 3 illustrates another example of a current versus voltage plot for a solar panel under different illumination levels, in accordance with one embodiment of the present invention.

FIG. 2 illustrates an example of a current versus voltage plot 200 of the solar panel 102, in accordance with one embodiment of the present invention. In the example of FIG. 2, under a certain light illumination level, the solar panel 102 can generate the highest power when the solar panel 102 works at the point 202 (referred to as the maximum power point in the present disclosure), in one embodiment. At the maximum power point 202, the product of the solar panel current $I_{SOLAR\_MPP}$ and the solar panel voltage $V_{SOLAR\_MPP}$ can reach a maximum level. Furthermore, the solar panel voltage $V_{SOLAR}$ increases as the solar panel current $I_{SOLAR}$ decreases. For a given solar panel 102, the solar panel current $I_{SOLAR\_MPP}$ and the solar panel voltage $V_{SOLAR\_MPP}$ can be determined once manufactured. For example, users can obtain these parameters from the datasheet/specification of the solar panel 102.

FIG. 3 illustrates another example of a current versus voltage plot 300 of the solar panel 102 under different illumination levels, in accordance with one embodiment of the present invention. According to curves 302-310, the output current $I_{SOLAR}$ and the output voltage $V_{SOLAR}$ of the solar panel 102 can decrease as the illumination level of the light declines. Likewise, the output current $I_{SOLAR}$ and the output voltage $V_{SOLAR}$ of the solar panel 102 can increase as the illumination level of the light increases. Thus, if the illumination level of the light is decreased, the solar panel 102 can maintain operating at the maximum power point by reducing the output current $I_{SOLAR}$, and vice versa. In other words, by controlling the output current $I_{SOLAR}$, the output voltage $V_{SOLAR}$ of the solar panel 102 can be regulated to the level $V_{SOLAR\_MPP}$ such that the solar panel 102 can work at the maximum power point.

Referring back to FIG. 1, the solar panel voltage $V_{SOLAR\_MPP}$ can be predetermined or programmed into the controller 110. The VSP pin 112 of the controller 110 coupled to a voltage divider having two resistors 104 and 106 is capable of sensing the solar panel voltage $V_{SOLAR}$. The solar panel current $I_{SOLAR}$ can flow through the inductor 130 and the resistor 132 to charge the battery 134. The voltage drop $V_{I\_CHARGE}$ across the resistor 132 can indicate the charging current $I_{CHARGE}$ and can be sensed via the ICHP pin 118 and ICHM pin 120 of the controller 110.

The ICHP pin 118 and ICHM pin 120 of the controller 110 are coupled to the resistor 132 which is coupled to the battery 134 in series. The charging current $I_{CHARGE}$ can be sensed or calculated from the voltage difference $V_{I\_CHARGE}$ between the ICHP pin 118 and the ICHM pin 120. In one embodiment, a predetermined reference voltage $V_{ICHPM\_MPP}$ indicating a predetermined maximum level $I_{CHARGE\_MAX}$ of the charging current $I_{CHARGE}$ can be programmed into the controller 110. Advantageously, the controller 110 can compare the charging current $I_{CHARGE}$ to the maximum level $I_{CHARGE\_MAX}$ by comparing $V_{I\_CHARGE}$ to $V_{ICHPM\_MPP}$. In this way, the power converter 103 can keep the charging current $I_{CHARGE}$ below the predetermined maximum level $I_{CHARGE\_MAX}$ so as to prevent the battery 134 from undergoing an over-current condition.

The controller 110 can alternately enable the high side switch 126 and the low side switch 128, such that the inductor 130 can be coupled to the solar panel 102 and ground alternately. Therefore, the switches 126 and 128 can be used to regulate the charging current $I_{CHARGE}$ and/or the solar panel voltage $V_{SOLAR}$.

During daytime, when the ambient light is bright enough, the solar panel 102 can generate the solar panel voltage $V_{SOLAR}$ at the node 152. The voltage $V_{SOLAR}$ can be sensed by the controller 110 at the VSP pin 112. A predetermined reference voltage $V_{VSP\_MPP}$ indicating the voltage $V_{SOLAR\_MPP}$ at the maximum power point can be programmed into the controller 116. The reference voltage $V_{VSP\_MPP}$ can be determined by the following equation (1):

$$V_{VSP\_MPP}=V_{SOLAR\_MPP}*R_{106}/(R_{104}+R_{106}), \quad (1)$$

where $R_{104}$ represents resistance of the resistor 104, and $R_{106}$ represents resistance of the resistor 106. If the voltage at the VSP pin is equal to or higher than the predetermined reference voltage $V_{VSP\_MPP}$, the power converter 103 can operate in the charging mode. The diode 108 is forward-biased to couple the battery 134 to the solar panel 102. The controller 110 can control the high side switch 126 and the low side switch 128 such that the current $I_{SOLAR}$ from the solar panel 102 can flow through the inductor 130 to charge the battery 134.

In the charging mode, the power converter 103 can maintain the output voltage $V_{SOLAR}$ of the solar panel 102 at the threshold voltage $V_{SOLAR\_MPP}$ by adjusting the charging current $I_{CHARGE}$ of the battery 134. More specifically, in one embodiment, the controller 110 can compare the sensed voltage at the VSP pin 112 to the reference voltage $V_{VSP\_MPP}$, and can adjust the PWM signal 190 accordingly. For example, if the sensed voltage at the VSP pin 112 is greater than the reference voltage $V_{VSP\_MPP}$, the controller 110 can increase the ratio of the ON time period to OFF time period of the high side switch 126 and decrease the ratio of the ON time period to OFF time period of the low side switch 128, e.g., by increasing the duty cycle of the PWM signal 190 provided by the controller 110. As such, the charging current $I_{CHARGE}$ can be increased. Accordingly, the output current $I_{SOLAR}$ of the solar panel 102 can be increased to decrease the output voltage $V_{SOLAR}$. Advantageously, during the charging mode, the solar panel 102 can operate at the maximum power point by regulating the output voltage $V_{SOLAR}$ at $V_{SOLAR\_MPP}$. In another word, a maximum power output of the solar panel 102 can be transferred to the battery 134 in the charging mode. Thus, the efficiency of the power conversion circuit 100 can be improved.

When the ambient light is relatively dark, the voltage $V_{SOLAR}$ at the node 152 is decreased and the electric power generated by the solar panel 102 may not be able to charge the battery 134. In one embodiment, if the voltage at the VSP pin is less than the reference voltage $V_{VSP\_MPP}$, the power converter 103 can operate in the powering mode. The diode 108 is reverse biased to decouple the battery 134 from the solar panel 102. In this circumstance, the charging current $I_{CHARGE}$ decreases until power stored in the inductor 130 is consumed. After the current flowing through the inductor 130 is reversed, the power converter 103 enters the powering mode in which the voltage of the battery 134 is boosted to power the LED string 138.

When the power converter 103 operates in the powering mode, the voltage of the battery 134 can be boosted by enabling the high side switch 126 and the low side switch 128 alternately to drive the LED string 138. For example, when the high side switch 126 is disabled and the low side switch 128 is enabled, the current from the battery 134 can flow through the inductor 130 and the electric power can be accumulated in the inductor 130. When the high side switch 126 is enabled and the low side switch 128 is disabled, the current can flow to the LED string 138, and the voltage at the node 154 can be boosted. The capacitor 136 is used to accumulate electric power from the inductor 130 and filter the ripple of the current and voltage for powering the LED string 138. As such, when the ambient light is relatively dark, the LED string 138 can still be powered by boosting the voltage of the battery 134.

In one embodiment, an LED has a threshold voltage, such as 1.4V-3V, and the LED can be powered on when a forward-biased voltage across the LED exceeds the threshold voltage. The threshold voltage $V_{LED\_TH}$ of the LED string 138 including N LEDs is N times of the threshold voltage of one LED. If the forward-biased voltage of the LED string 138, e.g., the voltage across the LED string, remains higher than the LED string threshold voltage $V_{LED\_TH}$, the voltage across the LED string 138 can remain at a substantially constant operating voltage $V_{LED\_ON}$ in spite of the voltage fluctuation at the node 154, in one embodiment.

The LED string 138 also has an intrinsic parameter, e.g., a maximum operating current $I_{LED\_MAX}$. The power conversion circuit 100 further includes a resistor 140. The resistor 140 coupled to the LED string 138 is operable for sensing the operating current $I_{LED\_ON}$ of the LED string 138. A voltage $V_{R140}$ across the resistor 140 can indicate the operating current $I_{LED\_ON}$. The CSP pin 122 and CSN pin 124 of the controller 110 are respectively coupled to the two terminals of the resistor 140. The controller 110 can monitor the operating current $I_{LED\_ON}$ by monitoring a voltage between the CSP pin 122 and CSN pin 124, e.g., $V_{R140}$.

In one embodiment, the controller 110 can maintain the operating current $I_{LED\_ON}$ at a predetermined reference level $I_{LED\_REF}$. $I_{LED\_REF}$ can be less than $I_{LED-MAX}$. More specifically, a predetermined reference voltage $V_{140\_REF}$ indicating the reference current $I_{LED\_REF}$ can be programmed into the controller 110. The controller 110 compares the sensed operating current $I_{LED\_ON}$ to the reference current $I_{LED\_REF}$ by comparing $V_{R140}$ to $V_{140\_REF}$. If the operating current $I_{LED\_ON}$ is greater than the reference current $I_{LED\_REF}$, the controller 110 can control the switches 126 and 128 to reduce the operating current $I_{LED\_ON}$. For example, the controller 110 can increase the duty cycle of the PWM signal 190, which can decrease the operating current $I_{LED\_ON}$. As a result, the operating current $I_{LED\_ON}$ can be substantially maintained at the reference current $I_{LED\_REF}$, such that the LED string 138 can emit a relatively stable brightness. In addition, the operating current $I_{LED\_ON}$ flowing through the LED string 138 can be controlled below the maximum operating current $I_{LED\_MAX}$ to avoid an over-current condition.

If the ambient light becomes brighter, and the voltage sensed on the VSP pin 112 is equal to or greater than a threshold voltage, e.g., the reference voltage $V_{VSP\_MPP}$, the power converter 103 can be switched to the charging mode.

Figure 4:
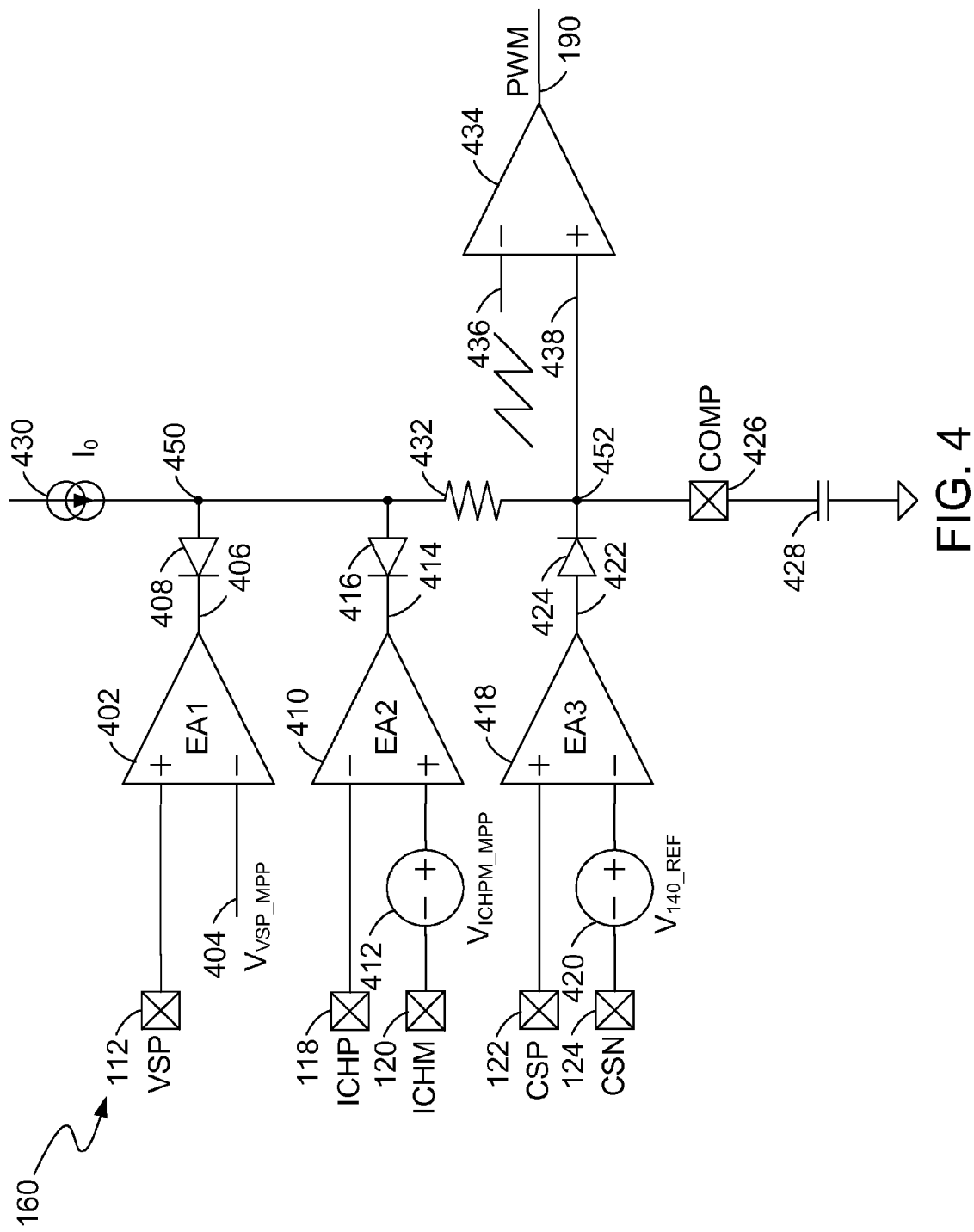
FIG. 4 illustrates an example of a regulator of FIG. 1, in accordance with one embodiment of the present invention.

FIG. 4 illustrates an example of the regulator 160 of FIG. 1, in accordance with one embodiment of the present invention. Elements labeled the same as in FIG. 1 have similar functions. FIG. 4 is described in combination with FIG. 1.

In the example of FIG. 4, the regulator 160 includes five input pins for sensing corresponding voltages and currents. The VSP pin 112 is used to sense the solar panel voltage $V_{SOLAR}$. The ICHP pin 118 and ICHM pin 120 are used to sense the charging current $I_{CHARGE}$. The CSP pin 122 and CSN pin 124 are used to sense the operating current $I_{LED\_ON}$ of the LED string 138. The regulator 160 further includes a current source 430, a capacitor 428, a resistor 432, multiple error amplifiers 402, 410 and 418, and a pulse width modulation signal generator, e.g., a comparator 434. Each error amplifier 402, 410 and 418 has a positive terminal, a negative terminal, and an output terminal. The output terminal can output a voltage level proportional to the forward difference between a voltage at the positive terminal and a voltage at the negative terminal.

In the charging mode, the error amplifier 402 is configured to compare the voltage sensed on the VSP pin 112 with the predetermined reference voltage $V_{VSP\_MPP}$ indicative of the solar panel voltage $V_{SOLAR\_MPP}$ at the maximum power point of the solar panel 102. The output terminal 406 of the error amplifier 402 is coupled to the current source 430 through a diode 408. A voltage at the output terminal 406 can be determined by a comparison result of the voltage at the VSP pin 112 and $V_{VSP\_MPP}$. If the voltage sensed on the VSP pin 112 is equal to the reference voltage $V_{VSP\_MPP}$, the output terminal 406 can output zero. If the voltage sensed on the VSP pin 112 is greater than the reference voltage $V_{VSP\_MPP}$, the output terminal 406 can output a positive value. If the voltage sensed on the VSP pin 112 is less than the reference voltage $V_{VSP\_MPP}$, the output terminal 406 can output a negative value.

Furthermore, in the charging mode, the error amplifier 410 is configured to compare the voltage difference $V_{I\_CHARGE}$ between the ICHP pin 118 and the ICHM pin 120 with a predetermined reference voltage $V_{ICHPM\_MPP}$. The reference voltage $V_{ICHPM\_MPP}$ indicates the maximum charging current $I_{CHARGE\_MAX}$. In one embodiment, the controller 110 includes a voltage source 412 coupled between the ICHM pin 120 and the positive terminal of the error amplifier 410. The voltage source 412 can provide the predetermined reference voltage $V_{ICHPM\_MPP}$. As such, the solar panel current $I_{SOLAR}$ or the charging current $I_{CHARGE}$ can be monitored by the error amplifier 410. The output terminal 414 of the error amplifier 410 is coupled to the current source 430 through a diode 416. Similar to the error amplifier 402, the voltage at the output terminal 414 can be positive, zero or negative based on a comparison result of $V_{I\_CHARGE}$ and $V_{ICHPM\_MPP}$.

In the powering mode, the error amplifier 418 is configured to compare the voltage difference $V_{R140}$ between the CSP pin 122 and the CSN pin 124 with the predetermined reference voltage $V_{140\_REF}$ indicative of the predetermined reference current $I_{LED\_REF}$. In one embodiment, the controller 110 includes a reference voltage source 420 coupled between the CSN pin 124 and the negative terminal of the error amplifier 418. The voltage source 420 can provide the reference voltage $V_{140\_REF}$. The output terminal 422 of the error amplifier 418 is coupled to the current source 430 through a diode 424. The diode 424 is placed in an opposite direction compared to the diodes 408 and 416. Similar to the error amplifier 402, the voltage at the output terminal 422 can be positive, zero or negative based on a comparison result of $V_{R140}$ and $V_{140\_REF}$.

The comparator 434 is operable for generating the PWM signal 190 in both the charging mode and the powering mode. The comparator 434 has a negative terminal for receiving a sawtooth-wave voltage signal 436 or any periodical signal such as a triangular signal or a sinusoidal signal, and has a positive terminal for receiving the voltage 438 at the node 452. The node 452 is coupled to the COMP pin 426 which is coupled to ground through a capacitor 428. Through a trailing-edge modulation, the comparator 434 can compare the sawtooth-wave voltage 436 with the voltage 438 at the node 452 and can generate the PWM signal 190 at the output terminal according to a result of the comparison. In the example of FIG. 4, the duty cycle of the PWM signal 190 increases if the voltage 438 at the node 452 is increased. Likewise, the duty cycle of the PWM signal 190 decreases if the voltage 438 at the node 452 is decreased. The frequency of the sawtooth-wave voltage signal 436 determines the frequency of the PWM signal 190, in one embodiment. To avoid or reduce an audible switching noise, the frequency of the sawtooth-wave signal 436 can be greater than 25 KHz, in one embodiment.

In operation, the error amplifiers 402, 410 and 418 can work in the linear region. Initially, e.g., during a start-up duration of the power conversion circuit 100, both the charging current $I_{CHARGE}$ and the load current $I_{LED\_ON}$ may be zero. All the voltages at the ICHP pin 118, the ICHM pin 120, the CSP pin 122, and the CSN pin 124 may be zero. Thus, the error amplifier 418 can output a negative voltage. The error amplifier 410 can output a positive voltage. Assuming that the voltage at the node 450 and the voltage at the node 452 are both zero, the diodes 416 and 424 are both reverse-biased and disabled.

When the ambient light is relatively dark, the voltage at the VSP pin is less than $V_{VSP\_MPP}$. The error amplifier 402 can output a negative voltage. The diode 408 is forward biased and thus the voltage at the node 450 drops. Furthermore, the resistor 432 discharges the capacitor 428 to pull down the voltage 438 at the node 452. As such, the duty cycle of the PWM signal 190 is decreased. When the duty cycle of the PWM signal 190 is decreased, the voltage at the node 154 can be increased. The diode 108 can be reverse-biased to decouple the battery 134 from the solar panel 102. Therefore, the power converter 103 enters the powering mode.

After the voltage at the node 154 reaches the operating voltage of the LED string 138, an operating current $I_{LED\_ON}$ flows through the LED string 138, such that the LED string 138 is lit. The CSP pin 122 and the CSN pin 124 of the regulator 160 can sense the voltage difference $V_{R140}$ indicative of the operating current $I_{LED\_ON}$. The voltage at the node 154 increases continuously as the duty cycle of the PWM signal 190 decreases, such that the operating current $I_{LED\_ON}$ increases. When the operating current $I_{LED\_ON}$ reaches the predetermined reference level $I_{LED\_REF}$, the error amplifier 418 outputs a positive voltage and the diode 424 is forward biased to pull up the voltage 438. As the error amplifier 402 pulls down the voltage 438 through the resistor 432, and the error amplifier 418 pulls up the voltage 438, a balance state can be achieved in which the voltage 438 is maintained substantially constant and the operating current $I_{LED\_ON}$ is maintained at the predetermined reference level $I_{LED\_REF}$, in one embodiment.

When the ambient light becomes brighter, the voltage at the VSP pin is increased. If the voltage at the VSP pin is greater than the predetermined reference level $V_{VSP\_MPP}$, the error amplifier 402 outputs a positive voltage at the output terminal 406. The diode 408 becomes reverse-biased. The current source 430 charges the capacitor 428 to increase the voltage 438. As such, the duty cycle of the PWM signal 190 is increased. Accordingly, the voltage at the node 154 is decreased and the diode 108 becomes forward biased to couple the battery 134 to the solar panel 102. The operating current $I_{LED\_ON}$ is reduced to zero when the voltage at the node 154 drops below the operating voltage of the LED string 138. The error amplifier 418 outputs a negative voltage to disable the diode 424 accordingly. The solar panel current $I_{SOLAR}$ can flow into the power converter 103 to charge the battery 134. As such, the power converter 130 enters the charging mode.

In the charging mode, the controller 110 can maintain the solar panel voltage $V_{SOLAR}$ at the predetermined maximum power point $V_{SOLAR\_MPP}$. If the voltage at the VSP pin is greater than $V_{VSP\_MPP}$, the error amplifier 402 outputs a positive voltage at the output terminal 406 to reverse bias the diode 408. Thus, the current source 430 can charge the capacitor 428 to increase the duty cycle of the PWM signal 190, such that the charging current $I_{CHARGE}$ or solar panel current $I_{SOLAR}$ is increased. According to FIG. 2, the solar panel voltage $V_{SOLAR}$ decreases as the solar current $I_{SOLAR}$ increases. If the voltage at the VSP pin is less than $V_{VSP\_MPP}$, the error amplifier 402 outputs a negative voltage at the output terminal 406 to forward bias the diode 408. Thus, the diode 408 can discharge the capacitor 428 to decrease the duty cycle of the PWM signal 190. Likewise, as the duty cycle of the PWM signal 190 decreases, the solar panel current $I_{SOLAR}$ decreases and the solar panel voltage $V_{SOLAR}$ increases. As such, the solar panel voltage $V_{SOLAR}$ can be maintained at the predetermined maximum power point $V_{SOLAR\_MPP}$ to achieve the maximum power output.

In the charging mode, the power converter 103 can maintain the charging current $I_{CHARGE}$ below the predetermined reference level $I_{CHARGE\_MAX}$ to avoid occurrence of an over-current condition. If the ambient light is strong enough, the voltage at the VSP pin can be greater than $V_{VSP\_MPP}$ and the charging current $I_{CHARGE}$ may reach the $I_{CHARGE\_MAX}$. In this instance, the voltage at the output terminal 414 of the error amplifier 410 is negative. The diode 416 is forward biased. The diode 416 can discharge the capacitor 428 to decrease the duty cycle of the PWM signal 190, and thus decreases the charging current $I_{CHARGE}$ until $I_{CHARGE}$ becomes less than $I_{CHARGE\_MAX}$. As a result, the over-current condition can be avoided. Furthermore, as the charging current $I_{CHARGE}$ (or the solar current $I_{SOLAR}$) decreases, the voltage at the VSP pin can be increased. As such, the voltage at the output terminal 406 of the error amplifier 402 remains positive such that the diode 408 is disabled.

Figure 5:
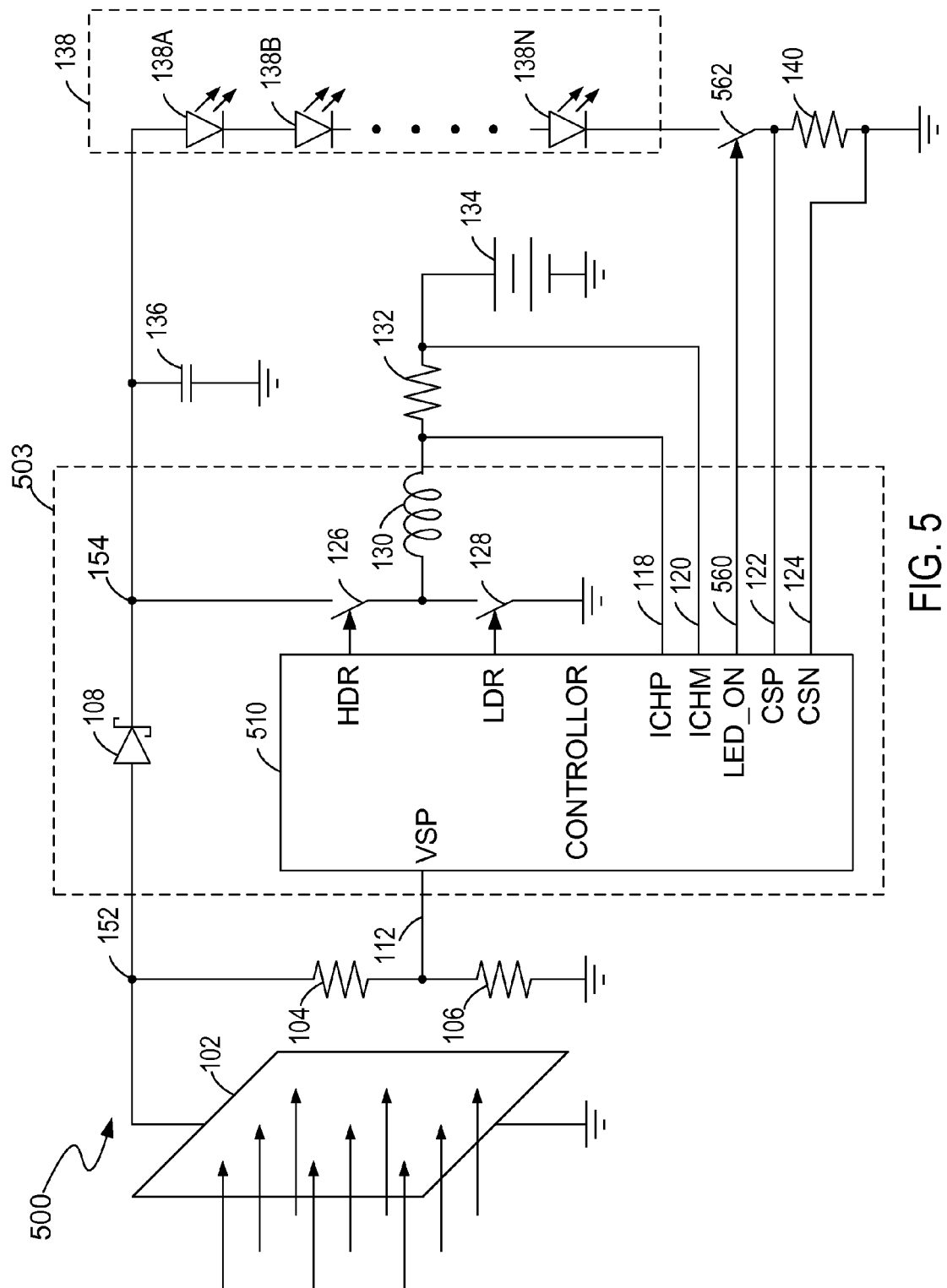
FIG. 5 illustrates another schematic diagram of a power conversion circuit, in accordance with one embodiment of the present invention.

FIG. 5 illustrates another schematic diagram of a power conversion circuit 500, in accordance with one embodiment of the present invention. Elements labeled the same as in FIG. 1 and FIG. 4 have similar functions. FIG. 5 is described in combination with FIG. 1.

The power conversion circuit 500 further includes a switch 562 coupled in series with the LED string 138. The controller 510 can perform similar functions as the controller 110 of FIG. 1. Moreover, the controller 510 can further compare the voltage at the VSP pin with an internal preset voltage $V_{PRESET}$ and can generate an LED control signal 560 to control the switch 562 according to the comparison result. The internal preset voltage $V_{PRESET}$ is different from the reference voltage $V_{VSP\_MPP}$, in one embodiment. The switch 562 can be switched on if the voltage at the VSP pin is less than the internal preset voltage $V_{PRESET}$ and can be switched off if the voltage at the VSP pin is greater than the internal preset voltage $V_{PRESET}$. In one embodiment, the internal preset voltage $V_{PRESET}$ can be equal to or less than the operating voltage required to drive the LED string 538 (e.g., the LED string threshold voltage $V_{LED-TH}$) and is less than the reference voltage $V_{VSP\_MPP}$.

As such, when the voltage at the VSP pin is greater than the reference voltage $V_{VSP\_MPP}$, the power converter 503 can operate in the charging mode and the switch 562 is switched off (LED string 538 is not powered), in one embodiment. When the voltage at VSP pin is less than the internal preset voltage $V_{PRESET}$, the power converter 503 can operate in the powering mode and the switch 562 is switched on, such that the LED string 138 can be powered/lit by the battery 534, in one embodiment. When the voltage at VSP pin is greater than the internal preset voltage $V_{PRESET}$ but less than the reference voltage $V_{VSP\_MPP}$, the LED string 538 is not powered by the battery 534, in one embodiment.

Figure 6:
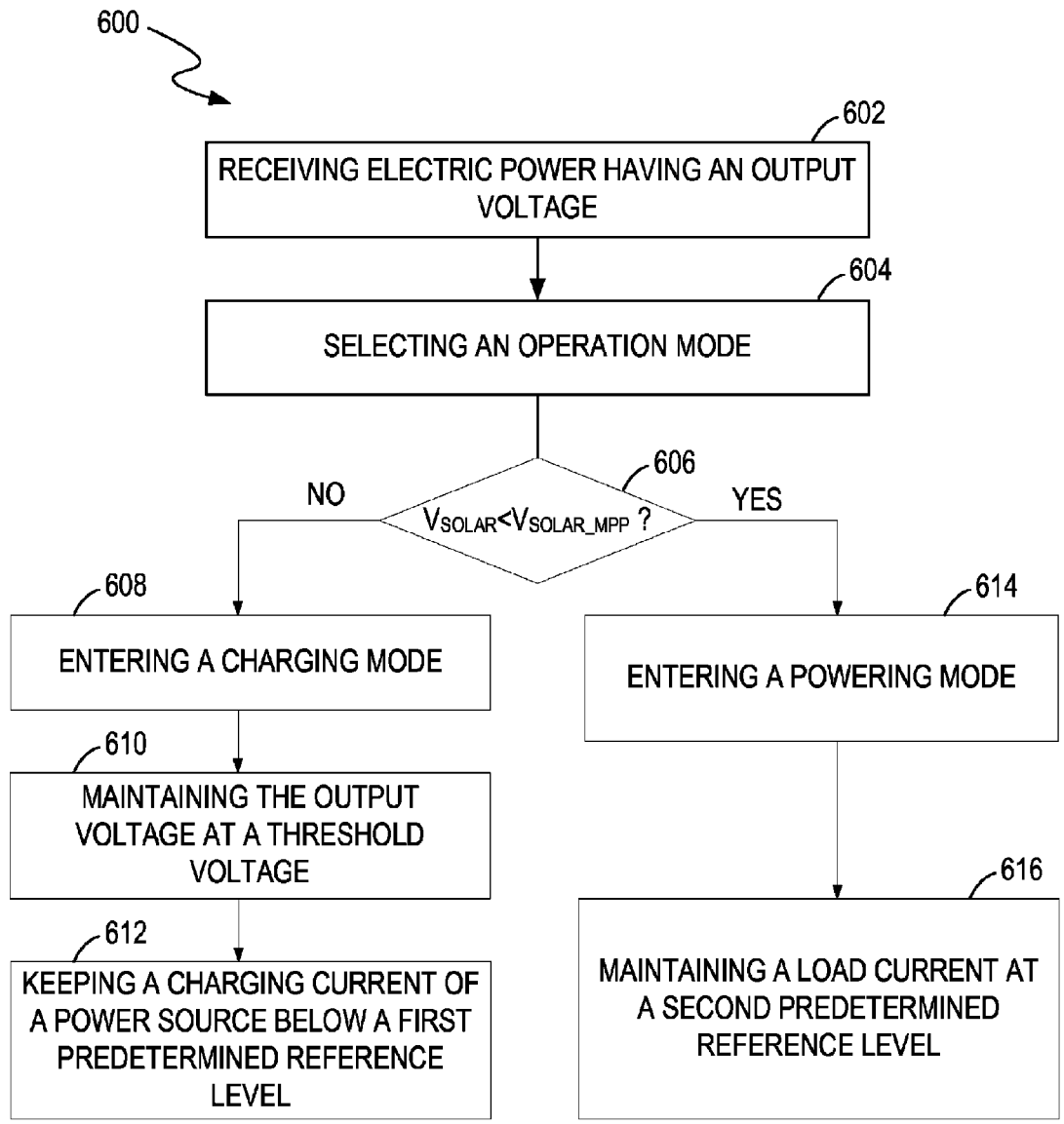
FIG. 6 illustrates a flowchart of operations performed by a power conversion circuit, in accordance with one embodiment of the present invention.

FIG. 6 illustrates a flowchart 600 of operations performed by a power conversion circuit, e.g., the power conversion circuit 100, in accordance with one embodiment of the present invention. FIG. 6 is described in combination with FIG. 1-FIG. 5. Although specific steps are disclosed in FIG. 6, such steps are examples. That is, the present invention is well suited to performing various other steps or variations of the steps recited in FIG. 6.

In block 602, electric power having an output voltage, e.g., the output voltage $V_{SOLAR}$, is received.

In block 604, an operation mode is selected from at least a charging mode and a powering mode. In block 606, the output voltage is compared with a threshold voltage, e.g., $V_{SOLAR\_MPP}$, to determine the operation mode. In one embodiment, if the output voltage is less than the threshold voltage, the flowchart 600 enters block 614. Otherwise, the flowchart 600 enters block 608.

In block 608, a power converter, e.g., the power converter 103, enters a charging mode in which the electric power is transferred to a power source, e.g., the battery 134. In block 610, a charging current of the power source is adjusted to maintain the output voltage at the threshold voltage in the charging mode. In block 612, the charging current of the battery is sensed and compared with a first predetermined reference level, e.g., $I_{CHARGE\_MAX}$, to keep the charging current below the first predetermined reference level.

In block 614, the power converter enters a powering mode in which power from the power source is delivered to a load. In block 616, a load current, e.g., the operating current $I_{LED\_ON}$, flowing through the load is sensed and compared with a second predetermined reference level, e.g., $I_{LED\_REF}$, to maintain the load current at the second predetermined reference level.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A power conversion circuit comprising:
   a first terminal for receiving electric power having an output voltage from a solar panel exposed to light; and
   a power converter coupled between said first terminal and a second terminal, and for selectively operating in a charging mode and a powering mode, wherein said power converter receives said output voltage at said first terminal, transfers said electric power to provide a voltage at said second terminal to a power source and maintains said output voltage at said first terminal at a threshold voltage in said charging mode, wherein said power converter reduces an output current of said solar panel to maintain said output voltage at said threshold voltage if an illumination level of said light decreases in said charging mode, wherein said power converter increases said output current of said solar panel to maintain said output voltage at said threshold voltage if said illumination level of said light increases in said charging mode, and wherein said power converter delivers power from said power source to a load in said powering mode.

2. The power conversion circuit as claimed in claim 1, wherein said power converter selectively operates in said charging mode and said powering mode based on a comparison result of said output voltage at said first terminal and said threshold voltage.

3. The power conversion circuit as claimed in claim 1, wherein said power converter maintains said output voltage at said first terminal at said threshold voltage by increasing a charging current of said power source if said output voltage at said first terminal is greater than said threshold voltage and decreasing said charging current if said output voltage at said first terminal is less than said threshold voltage.

4. The power conversion circuit as claimed in claim 1, wherein said solar panel generates a maximum power of said electric power if said output voltage at said first terminal is maintained at said threshold voltage.

5. The power conversion circuit as claimed in claim 1, further comprising:
a resistor coupled to said power source and for sensing a charging current of said power source,
wherein said power converter compares said charging current with a predetermined reference level to keep said charging current below said predetermined reference level.

6. The power conversion circuit as claimed in claim 1, further comprising:
a resistor coupled to said load and for sensing a load current flowing through said load,
wherein said power converter compares said load current with a predetermined reference level to maintain said load current at said predetermined reference level.

7. The power conversion circuit as claimed in claim 1, wherein said power converter comprises a first error amplifier coupled to a node and for adjusting a node voltage at said node according to a comparison result of said output voltage at said first terminal and said threshold voltage.

8. The power conversion circuit as claimed in claim 7, wherein said power converter adjusts said node voltage to maintain said output voltage at said first terminal at said threshold voltage.

9. The power conversion circuit as claimed in claim 7, wherein said power converter further comprises a second error amplifier coupled to said node and for adjusting said node voltage according to a comparison result of a load current flowing through said load and a predetermined reference level.

10. The power conversion circuit as claimed in claim 1, wherein said output voltage at said first terminal is greater than said voltage at said second terminal.

11. The power conversion circuit as claimed in claim 4, wherein said maximum power of said electric power varies if said illumination level of said light varies.

12. A method for converting power, said method comprising:
receiving electric power having an output voltage at a first terminal from a solar panel exposed to light;
selecting an operation mode from at least a charging mode and a powering mode;
maintaining said output voltage at said first terminal at a threshold voltage in said charging mode, wherein said maintaining step comprises reducing an output current of said solar panel to maintain said output voltage at said threshold voltage if an illumination level of said light decreases and increasing said output current of said solar panel to maintain said output voltage at said threshold voltage if said illumination level of said light increases;
transferring said electric power to provide a voltage at a second terminal to a power source in said charging mode; and
delivering power from said power source to a load in said powering mode.

13. The method as claimed in claim 12, wherein said selecting step comprises:
comparing said output voltage at said first terminal with said threshold voltage; and
selecting said operation mode from at least said charging mode and said powering mode based on a result of the comparison.

14. The method as claimed in claim 12, wherein said maintaining step comprises:
increasing a charging current of said power source if said output voltage at said first terminal is greater than said threshold voltage; and
decreasing said charging current if said output voltage at said first terminal is less than said threshold voltage.

15. The method as claimed in claim 12, further comprising:
sensing a charging current of said power source; and
comparing said charging current with a predetermined reference level to keep said charging current below said predetermined reference level.

16. The method as claimed in claim 12, further comprising:
sensing a load current flowing through said load; and
comparing said load current with a predetermined reference level to maintain said load current at said predetermined reference level.

17. A power conversion circuit comprising:
a power converter having a first terminal and a second terminal, and optionally coupled to a solar panel, and for selectively operating in a charging mode and a powering mode, wherein said solar panel is capable of converting light power to electric power and providing an output voltage at said first terminal when said solar panel is exposed to light, said power converter comprising:
a power stage for receiving said output voltage at said first terminal, providing a voltage at said second terminal to charge a battery in said charging mode, and delivering power from said battery to power a load in said powering mode; and
a controller coupled to said power stage and for selecting an operation mode from at least said charging mode and said powering mode according to a comparison result of said output voltage at said first terminal and a threshold voltage, and for maintaining said output voltage at said first terminal at said threshold voltage in said charging mode, wherein said controller reduces an output current of said solar panel to maintain said output voltage at said threshold voltage if an illumination level of said light decreases in said charging mode, and wherein said controller increases said output current of said solar panel to maintain said output voltage at said threshold voltage if said illumination level of said light increases in said charging mode.

18. The power conversion circuit as claimed in claim 17, wherein said solar panel generates a maximum power of said electric power when said output voltage at said first terminal is maintained at said threshold voltage.

19. The power conversion circuit as claimed in claim 17, wherein said controller comprises:
a pulse width modulation signal generator for providing a pulse width modulation signal; and
an error amplifier coupled to said pulse width modulation signal generator and for comparing said output voltage at said first terminal with said threshold voltage, adjusting a duty cycle of said pulse width modulation signal to increase a charging current of said battery if said output voltage at said first terminal is greater than said threshold voltage, and adjusting said duty cycle to decrease said charging current if said output voltage at said first terminal is less than said threshold voltage.

20. The power conversion circuit as claimed in claim 17, wherein said controller comprises:

a pulse width modulation signal generator for providing a pulse width modulation signal; and an error amplifier coupled to said pulse width modulation signal generator and for comparing a charging current of said battery with a predetermined reference level, and for adjusting a duty cycle of said pulse width modulation signal to keep said charging current below said predetermined reference level.

* * * * *